United States Patent
Lagarde et al.

(10) Patent No.: US 11,808,160 B2
(45) Date of Patent: Nov. 7, 2023

(54) SUB-ASSEMBLY FOR MOUNTING A GUIDE BEARING OF A COMPRESSOR SHAFT

(71) Applicant: SAFRAN AIRCRAFT ENGINES, Paris (FR)

(72) Inventors: Romain Nicolas Lagarde, Moissy-Cramayel (FR); Marie-Charline Stéphanie Charbonnier, Moissy-Cramayel (FR); Jean-Marc Claude Perrollaz, Moissy-Cramayel (FR); Lilian Yann Dumas, Moissy-Cramayel (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 143 days.

(21) Appl. No.: 17/435,428

(22) PCT Filed: Mar. 2, 2020

(86) PCT No.: PCT/HR2020/050409
§ 371 (c)(1),
(2) Date: Sep. 1, 2021

(87) PCT Pub. No.: WO2020/183089
PCT Pub. Date: Sep. 17, 2020

(65) Prior Publication Data
US 2022/0127973 A1 Apr. 28, 2022

(30) Foreign Application Priority Data
Mar. 8, 2019 (FR) ...................................... 1902408

(51) Int. Cl.
*F01D 25/16* (2006.01)

(52) U.S. Cl.
CPC ........ *F01D 25/162* (2013.01); *F05D 2220/32* (2013.01); *F05D 2230/60* (2013.01); *F05D 2230/70* (2013.01); *F05D 2240/54* (2013.01)

(58) Field of Classification Search
CPC .... F01D 25/16; F01D 25/162; F05D 2220/32; F05D 2230/60; F05D 2230/70; F05D 2240/54; F16C 2226/60; F16C 35/073
See application file for complete search history.

(56) References Cited

U.S. PATENT DOCUMENTS 3,343,854 A * 9/1967 Dennison .................. F01D 5/06
411/948
6,338,578 B1 * 1/2002 Adde .................... F16C 35/073
384/906

(Continued)

FOREIGN PATENT DOCUMENTS

DE 856335 C 11/1952
EP 1498624 A1 1/2005

(Continued)

OTHER PUBLICATIONS

Search Report issued in French Patent Application No. 1902408 dated Nov. 14, 2019.

(Continued)

*Primary Examiner* — Topaz L. Elliott
(74) *Attorney, Agent, or Firm* — Pearne & Gordon LLP (57) ABSTRACT

A sub-assembly of a turbine engine including a shaft, a bearing for guiding an axial end of the shaft, a nut which is screw-connected to the end of the shaft and a member for blocking the rotation of the nut in relation to the end of the shaft, wherein the member for blocking the nut includes a first section bearing a plurality of flexible tabs, one end of each tab of which cooperates with a radially inner annular wall of the end of the shaft and includes a second section which cooperates with the nut, characterised in that the (Continued)

second section of the blocking member is screw-connected to the nut and the features of the thread between the blocking member and the nut are different from the features of the thread between the nut and the end of the shaft.

9 Claims, 4 Drawing Sheets

(56) References Cited

U.S. PATENT DOCUMENTS

| | | | | |
|---|---|---|---|---|
| 7,128,529 B2* | 10/2006 | Le Jeune | ................ | F01D 25/16 416/244 A |
| 7,690,206 B2* | 4/2010 | Servant | ..................... | F02C 7/36 60/792 |
| 7,870,744 B2* | 1/2011 | Galivel | ..................... | F02C 7/36 60/802 |
| 8,794,922 B2* | 8/2014 | Bart | .......................... | F02C 7/36 416/170 R |
| 9,574,600 B2* | 2/2017 | Lagarde | .................. | F16B 39/10 |
| 2005/0013696 A1* | 1/2005 | Le Jeune | ................ | F01D 25/16 416/244 A |
| 2007/0177935 A1* | 8/2007 | Galivel | .................. | F01D 5/026 403/118 |
| 2007/0177936 A1* | 8/2007 | Servant | ..................... | F16D 1/06 403/118 |
| 2008/0317594 A1* | 12/2008 | Servant | ..................... | F16D 1/06 384/510 |
| 2012/0020774 A1* | 1/2012 | Bart | ....................... | F01D 25/162 415/122.1 |
| 2013/0313799 A1 | 11/2013 | Ruedi et al. | | |
| 2014/0369784 A1* | 12/2014 | Lagarde | .................... | F16D 1/06 411/81 |
| 2016/0116068 A1 | 4/2016 | Lagarde et al. | | |
| 2016/0307855 A1 | 10/2016 | Charbonnier et al. | | |
| 2017/0343033 A1 | 11/2017 | Sarazin et al. | | |
| 2018/0087389 A1 | 3/2018 | Joly et al. | | |
| 2019/0006221 A1 | 1/2019 | Charbonnier et al. | | |
| 2019/0171274 A1 | 6/2019 | Bhandaru et al. | | |
| 2019/0196333 A1 | 6/2019 | Charbonnier et al. | | |
| 2020/0040764 A1 | 2/2020 | Hugon et al. | | |

FOREIGN PATENT DOCUMENTS

| | | | |
|---|---|---|---|
| FR | 2783579 A1 | | 3/2000 |
| JP | 3198814 U | * | 7/2015 |

OTHER PUBLICATIONS

International Search Report for issued in Application No. PCT/FR2020/050409 dated Jul. 31, 2020.

Written Opinion for PCT/FR2020/050409 dated Jul. 31, 2020.

* cited by examiner

SUB-ASSEMBLY FOR MOUNTING A GUIDE BEARING OF A COMPRESSOR SHAFT

This is the National Stage of PCT international application PCT/FR2020/050409, filed on Mar. 2, 2020 entitled "SUB-ASSEMBLY FOR MOUNTING A GUIDE BEARING OF A COMPRESSOR SHAFT", which claims the priority of French Patent Application No. 1902408 filed Mar. 8, 2019, both of which are incorporated herein by reference in their entirety.

TECHNICAL FIELD

The invention relates to a sub-assembly of a turbomachine, in particular an aircraft turbomachine, by which an inner ring of a bearing is mounted. In particular, this bearing ensuring guidance of a high-pressure compressor shaft, without this application being restrictive.

STATE OF THE ART

Engines with a fan include several compressor stages, in particular a low-pressure (LP) compressor and a high-pressure (HP) compressor. A wheel with large-sized movable blades, or fan, is disposed upstream of the low-pressure compressor, which feeds in both the primary stream that crosses the LP and HP compressors and the cold stream, or secondary stream, concentric with the primary stream.

Modern aeronautical engines are often made in the form of an assembly of modules which could include fixed portions and movable portions. A module is defined as a sub-assembly of an engine which has geometric characteristics at its interfaces with the adjacent modules that are sufficiently accurate so it could be delivered separately and which has undergone a distinct balancing when it includes rotating portions. The assembly of the modules allows making up a complete engine, while reducing as much as possible the operations of balancing and pairing interfacing parts.

The modularity of an engine is a key element for maintenance. Indeed, during an intervention, the parts must be easily accessible without having to dismount a large number of portions of the engine. In practice, a division into a few major modules is looked for. For example, for a turbojet engine with a fan, a division into three modules is looked for: a first major module for the front portion comprising the fan and the LP compressor, a second major module for the portion comprising the HP spool and a third major module for the rear portion of the engine comprising the LP turbine and the turbine shaft.

Building of turbomachines requires complicated arrangements because of the interlocking of the compressor and of the high-pressure turbine in the compressor and the low-pressure turbine, and of the presence of two concentric drivelines each linking the compressor of one stage to the corresponding turbine. This complication is felt especially during maintenance of the machine, when it has to be dismounted and then mounted again.

The problem arises regarding the accessibility to an inner nut in a sub-assembly ensuring the connection between a bearing for guiding the rotation of a high-pressure shaft tip of the high-pressure compressor, which is located axially at the level of the low-pressure compressor.

The bearing includes an inner ring which is press-fitted on a cylindrical portion of a bevel gear for driving accessories, which, in turn, is press-fitted on the shaft tip and rotatably coupled by a groove and rib system.

The inner nut is screwed onto the shaft tip to push the bevel gear axially downstream and the bevel gear, in turn, pushes the inner ring of the bearing downstream against a shoulder of the shaft tip.

A nut retainer is provided in order to avoid a possible loosening of the nut relative to the shaft tip.

According to a known embodiment, dismounting the major module including the high-pressure shaft is performed according to the sequence of the following steps:
 removal of the nut retainer;
 blocking of the rotation and translation of the nut by a specific tooling;
 rotation of the high-pressure shaft to unscrew the latter and thus obtain an axial movement of the major module downstream.

Thanks to this axial movement downstream of the major module, part of the fit interference between the bevel gear and the shaft tip is disengaged.

Upon completion of this third step, the extent of the axial movement of the major module is defined by the axial lengths of the threads of the nut and of the high-pressure shaft tip.

However, the known structure of the sub-assembly does not allow having a sufficient axial length of the thread to completely disengage the interference fit between the bevel gear and the shaft tip.

A cylinder is then used in a first step to carry on the disengagement of the interference fit, but it causes a considerable axial offset between the two rings of the bearing. This might damage the balls but also caulk the rolling rings.

The invention aims to provide a linking sub-assembly between a bearing and the high-pressure shaft tip allowing avoiding the use of the cylinder and preserving the integrity of the bearing by extension of the thread length of the nut.

DISCLOSURE OF THE INVENTION

The invention provides a sub-assembly of a turbomachine including a shaft of the turbomachine, a bearing for guiding an axial end of said shaft of the turbomachine, the sub-assembly including an axisymmetric sleeve mounted radially between the end of the shaft and an inner ring of the guide bearing, a nut which is linked to the end of the shaft by screwing and which axially tighten the sleeve against a shoulder of the end of the shaft and a member for blocking the nut in rotation relative to the end of the shaft, wherein the means for blocking the nut includes a first section carrying a plurality of flexible legs where one end A of each leg cooperates with an annular wall radially internal to the end of the shaft and includes a second section which cooperates with the nut, characterised in that the second section of the blocking member is linked to the nut by screwing and the characteristics of the thread between the blocking member and the nut are different from the characteristics of the thread between the nut and the end of the shaft.

Screwing of the nut into the shaft tip allows forming a thread with a longer axial length, thereby allowing having a sufficient axial length of the thread to completely disengage the interference fit between the bevel gear and the shaft tip.

Preferably, the direction of the thread between the blocking member and the nut is opposite to the direction of the thread between the nut and the end of the shaft.

Preferably, the end of the shaft includes a radially inner annular wall which features a thread and the nut includes a radially outer annular wall which features a thread cooperating with the thread of the end of the shaft.

Preferably, the nut includes a radially inner annular wall which features an inner thread and the blocking member includes a radially outer annular wall which features an outer thread cooperating with the inner thread of the nut.

Preferably, the radially inner annular wall of the end of the shaft includes at least one annular groove which receives said end A of each leg of the blocking member.

Preferably, the radially inner annular wall of the end of the shaft includes a first annular groove which receives said end A of each leg of the blocking member when the blocking member is screwed into the nut and a second annular groove which is offset with respect to the first annular groove, which receives said end A of each leg of the blocking member at least during a phase of mounting or dismounting the nut on the end of the shaft.

Preferably, the nut includes a downstream section which cooperates with the end of the shaft and with the blocking member by screwing and which is disposed concentrically with and within the end of the shaft, and the nut includes an upstream section which protrudes axially upstream with respect to the end of the shaft and which bears axially downstream against the axisymmetric sleeve.

The invention also provides a tool intended to cooperate with the blocking member of a sub-assembly according to the invention, characterised in that it is capable of imparting a radial deformation of the flexible legs in the direction of the main axis, in order to enable the rotation of the nut relative to the end of the shaft in a first direction.

The invention also provides a method for mounting a sub-assembly according to the invention, which includes:
 a step of deforming the flexible legs using a tool according to the invention, and of holding these in the deformed configuration;
 a step of inserting the blocking element into the end of the shaft in a predefined provisional axial position;
 a step of removing the tool to enable an elastic return of the legs in the radially deployed configuration;
 a step of placing the nut on the end of the shaft by screwing the nut onto the end of the shaft;
 a step consisting consecutively in elastically deforming the flexible legs by the tool, moving the blocking member axially upstream up to a blocking position of the nut and removing the tool to enable an elastic return of the legs.

The invention also provides a method for dismounting a sub-assembly according to the invention, which includes:
 a step of deforming the flexible legs using a tool according to the invention, and of holding these in the deformed configuration;
 a step of blocking the rotation and the translation of the nut by a specific tooling;
 a step of rotating the end of the shaft relative to the nut to unscrew the end of the shaft off the nut and thus obtaining an axial movement downstream of the end of the shaft relative to the nut and relative to the guide bearing.

BRIEF DESCRIPTION OF THE DRAWINGS

Other features and advantages of the invention will appear upon reading the following detailed description, for the understanding of which reference will be made to the appended figures wherein.

DETAILED DESCRIPTION

In the following description, the upstream to downstream orientation will refer to the axial direction and the left to right orientation with reference to the figures.

Figure 1:
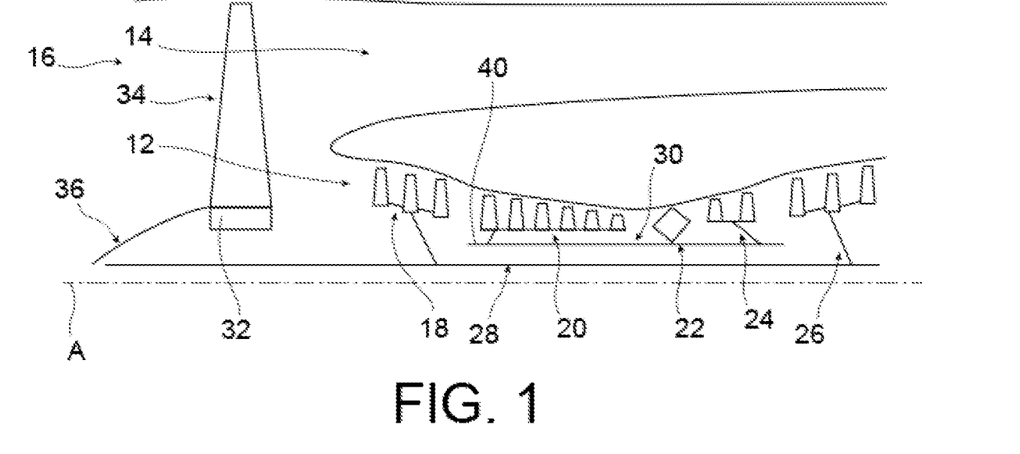
FIG. 1 is a schematic representation in axial section of an aircraft turbomachine.

FIG. 1 represents a bypass-type aircraft turbomachine 10 with a main axis A.

The turbomachine 10 includes a primary flow path 12 and a secondary flow path 14 coaxial with each other and coaxial with the main axis A. The primary flow path 12 is located radially inside the secondary flow path 14.

The turbomachine 10 also includes a fan 16 which is coaxial with the main axis A and which is installed at the upstream axial end of the turbomachine.

By its rotation, the fan 16 delivers air to the primary flow path 12 and to the secondary flow path 14.

The primary flow path 12 includes successively according to the axial direction, a low-pressure compressor 18, a high-pressure compressor 20, a combustion chamber 22, a high-pressure turbine 24 and a low-pressure turbine 26.

The low-pressure compressor 18 and the low-pressure turbine 26 are coupled to one another by a low-pressure shaft 28. The high-pressure compressor 20 and the high-pressure turbine 24 are coupled to one another by a high-pressure shaft 30.

The fan 16 mainly includes a fan disk 32, a plurality of blades 34 which are carried by the fan disk 32 while extending radially with respect to the main axis A of the turbomachine 10 and an inlet cone 36 which extends the fan disk 32 axially upstream, thereby conferring an aerodynamic configuration on the radially central portion of the fan 16.

The fan 16 is driven in rotation about the main axis A of the turbomachine 10 through the low-pressure shaft 28.

Figure 2:
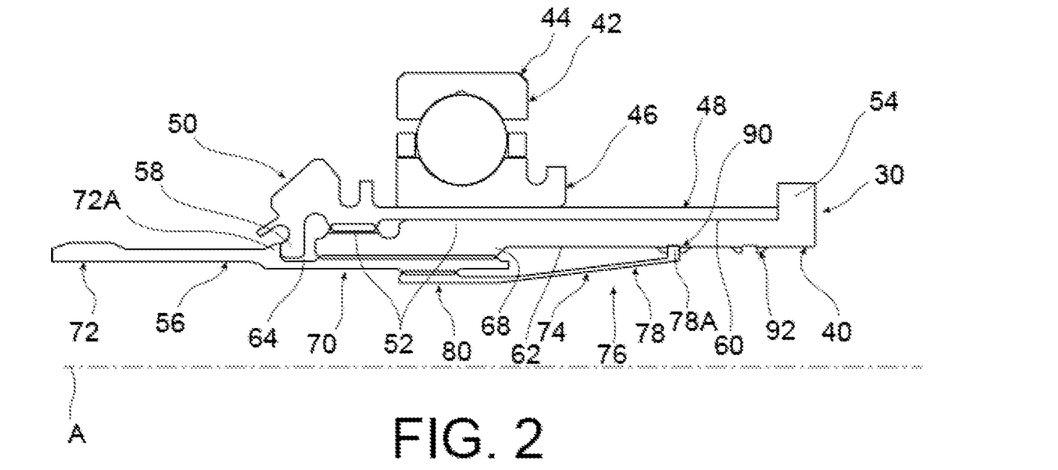
FIG. 2 is an enlarged detail of the turbomachine represented in FIG. 1, showing the linking sub-assembly between the bearing and the upstream end of the high-pressure shaft.

As shown in more details in FIG. 2, the rotational guidance of the upstream end 40 of the high-pressure shaft 30, which will be called shaft tip 40 later on, is achieved through a bearing 42.

The bearing 42 is a ball bearing and includes an outer ring 44 which is secured to a fixed element of the turbomachine 10 (not represented) and an inner ring 46 which is secured to the shaft tip 40.

More specifically, the inner ring 46 is assembled by press-fitting onto a cylindrical sleeve 48 belonging to a bevel gear 50 intended to couple an accessory of the turbomachine 10 with the high-pressure shaft 30. The cylindrical sleeve 48 is interposed between the inner ring 46 and the shaft tip 40 and it is, in turn, coupled to the high-pressure shaft 30 by press-fitting and by cooperation of complementary splines 52.

The bevel gear 50 abuts axially downstream against a shoulder 54 of the shaft tip 40 by a nut 56, which is screwed onto the shaft tip 40 and which bears axially downstream against an upstream end portion 58 of the bevel gear 50. A spacer (not represented is interposed axially between the downstream end 60 of the cylindrical sleeve 48 and the shoulder 54 of the shaft tip 40.

The nut 56 is screwed onto a radially inner face 62 of the shaft tip 40.

Figure 3A:
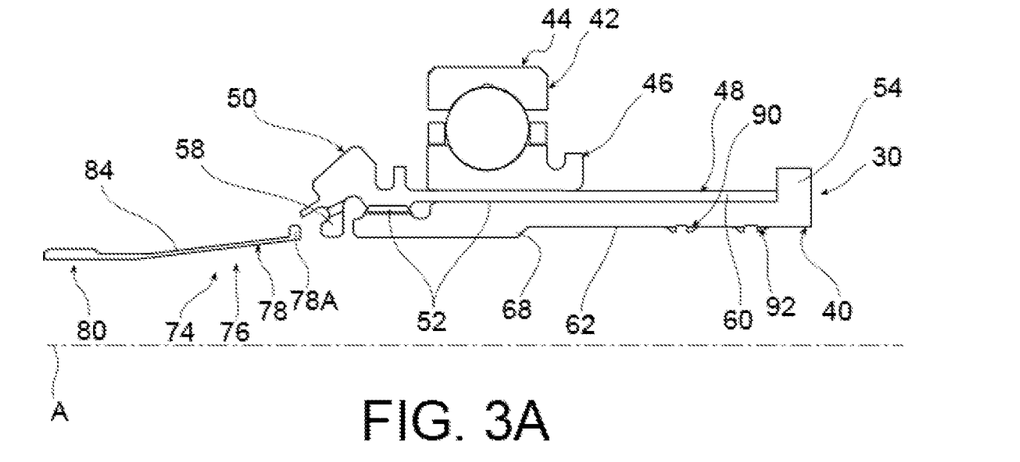
FIG. 3A
FIG. 3B
FIG. 3C
FIG. 3D
FIG. 3E are views of the sub-assembly represented in FIG. 2, representing several assembly steps.
Figure 3B:
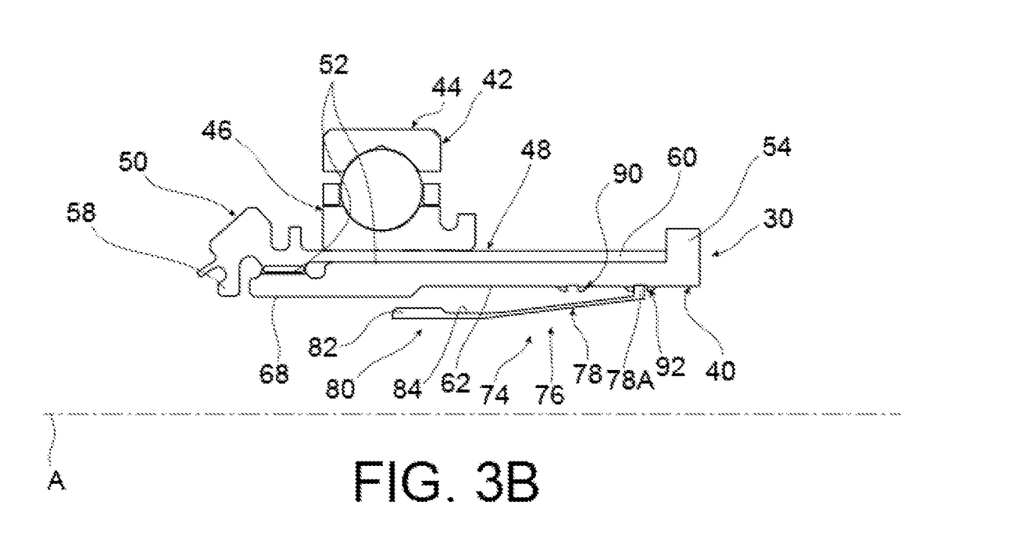
Figure 3C:
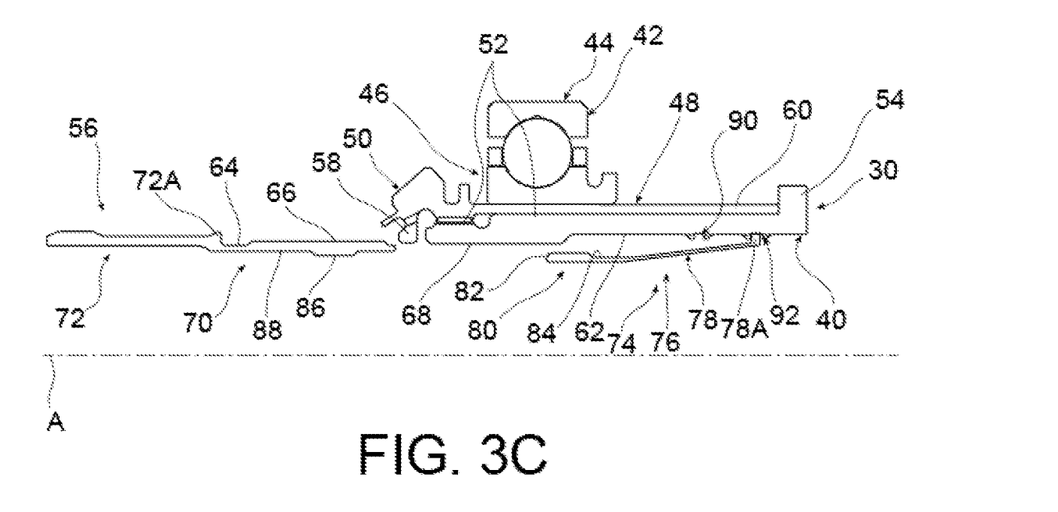

As shown in particular in FIG. 3C, the nut 56 includes a radially outer face 64 which includes a thread 66 complementary with a thread 68 of the radially inner face 62 of the shaft tip 40.

The axial length of these complementary threads of the nut 56 and of the shaft tip 40 is determined so as to allow disengaging the interference fit between the cylindrical sleeve 48 of the bevel gear 50 and the shaft tip 40.

The modification of this axial length has no effect on the axial bulk of the sub-assembly, which allows having an axial length larger than that implemented in the state of the art. In addition, this axial length is limited only by the axial dimension of the shaft tip 40.

The nut 56 includes a downstream section 70 which includes the outer face 64 over which the thread 66 is formed. This downstream section 70 is disposed concentrically with the inside of the shaft tip 40.

The nut 56 includes an upstream section 72 which extends the downstream section 70 upstream and which protrudes axially upstream with respect to the shaft tip 40.

The diameter of the upstream section 72 is larger than the diameter of the downstream section 70 and the downstream end 72A of the upstream section 72 is in contact axially downstream against the upstream end portion 58 of the bevel gear 50.

As said before, the nut 56 is intended to axially press the bevel gear 50 downstream against the shoulder 54 of the shaft tip 40.

A blocking member 74 cooperates with the nut 56 and the shaft tip 40 to prevent any rotation of the nut 56 relative to the shaft tip 40 and therefore to prevent loosening thereof.

The blocking member 74 includes a first section 76, which consists of a downstream section of the blocking member 74, which carries a plurality of flexible legs 78 where a free downstream end 78A of each leg 78 cooperates with the radially inner annular wall 62 of the shaft tip 40 and includes a second section 80, which consists of an upstream section of the blocking member 74, which cooperates with the nut 56.

Herein, the upstream section 80 of the blocking member 74 cooperates with the nut 56 by screwing and the free downstream end 78A of each leg 78 cooperates with at least one annular groove 90 formed in the radially inner annular wall 62 of the shaft tip 40, thereby preventing any axial movement of the blocking member 74 relative to the shaft tip 40.

When the blocking member 74 is in position in the shaft tip 40, each leg 78 is elastically deformed according to the radial direction in the direction of the main axis A. The free downstream end 78A of each leg 78 is then pressed radially outwards against the radially inner annular wall 62 of the shaft tip 40 by elastic return.

The upstream section 80 of the blocking member 74 is disposed coaxially within the downstream section 70 of the nut 56 and it includes a thread 82 formed over its outer annular face 84 which cooperates with a complementary thread 86 formed over the inner annular face 88 of the downstream section 70 of the nut 56.

To prevent any unscrewing of the nut 56 with the shaft tip 40, the characteristics of the thread between the nut 56 and the shaft tip 40 are different from the characteristics of the thread between the nut 56 and the blocking member 74.

Indeed, if these two threads have the same characteristics, the nut 56 could rotate freely relative to the shaft tip 40 and relative to the blocking member 74 and thus it could move axially, despite the fact that blocking member 74 is axially blocked relative to the shaft tip 40.

In contrast, since the two threads have different characteristics, any tendency of the nut 56 to rotate relative to the shaft tip 40 would cause an axial movement of the blocking member 74, which is made impossible by the axial blocking of the blocking member 74 relative to the shaft tip 40.

According to a preferred embodiment, the two threads are opposite to one another, that is to say one thread has a right-hand pitch and the other thread has a left-hand pitch.

According to one variant, the two threads have different pitches.

As said before, the downstream end 78A of each leg 78 of the blocking member 74 cooperates with at least one annular groove 90 formed on the radially inner face 62 of the shaft tip 40.

According to a preferred embodiment, the blocking member 74 is adapted to occupy two axial positions with respect to the shaft tip 40, a first position is occupied when the sub-assembly is assembled and a second provisional position which is occupied during the process of assembling the sub-assembly, as it will be seen later on.

Herein, and according to a preferred embodiment, the first position is located axially upstream with respect to the second position.

To hold the blocking member 74 in each of the two axial positions, the shaft tip 40 includes a first annular groove 90 with which the free downstream end 78A of each leg 78 of the blocking member 74 cooperates when the blocking member is in the first position and a second annular groove 92 with which the free downstream end 78A of each leg 78 of the blocking member 74 cooperates when the blocking member is in the second position.

Consequently, the second annular groove 92 is located axially downstream of the first annular groove 90.

In FIGS. 3A to 3D, different states of the sub-assembly that has just been described are represented, each corresponding to one step of the method for assembling the sub-assembly.

Referring to FIG. 3A, in a first step, the blocking member 74 is brought close to the shaft tip 40, on which the bevel gear 50 and the bearing 42 have been mounted beforehand, in a position located axially opposite and upstream of the shaft tip 40.

As shown in this figure, each leg 78 is not subjected to any mechanical stress so that its free downstream end 78A is located at a radial distance from the main axis A that is larger than the radial distance between the bottom of each annular groove 90, 92 of the shaft tip 40 and the main axis A.

In a second step, corresponding to the transition between the state represented in FIG. 3A towards the state represented in FIG. 3B, the blocking member 74 is moved towards its second provisional position mentioned before, which is the position located the farthest downstream.

For this purpose, firstly, the legs 78 are elastically deformed so as to bring their free downstream ends 78A close to the main axis A, in order to reduce the overall diameter of the blocking member 74. A specific tool (not represented) is used to impart this elastic deformation.

Secondly, the blocking member 74 is moved axially downstream in the shaft tip 40, up to an axial position corresponding to the second provisional position.

Thirdly, the elastic deformation of the legs 78 by the specific tool ceases, the legs 78 deploy radially outwards by elastic return and their free downstream ends 78A are inserted into the second annular groove 92 the farthest downstream.

This provisional position enables a subsequent assembly of the blocking member 74 with the nut 56 without the presence of the nut 56 disturbing the set-up of the blocking member 74.

In a third step, as shown in FIG. 3C, the nut 56 is brought close to the shaft tip 40, in a position located axially opposite and upstream of the shaft tip 40.

Figure 3D:
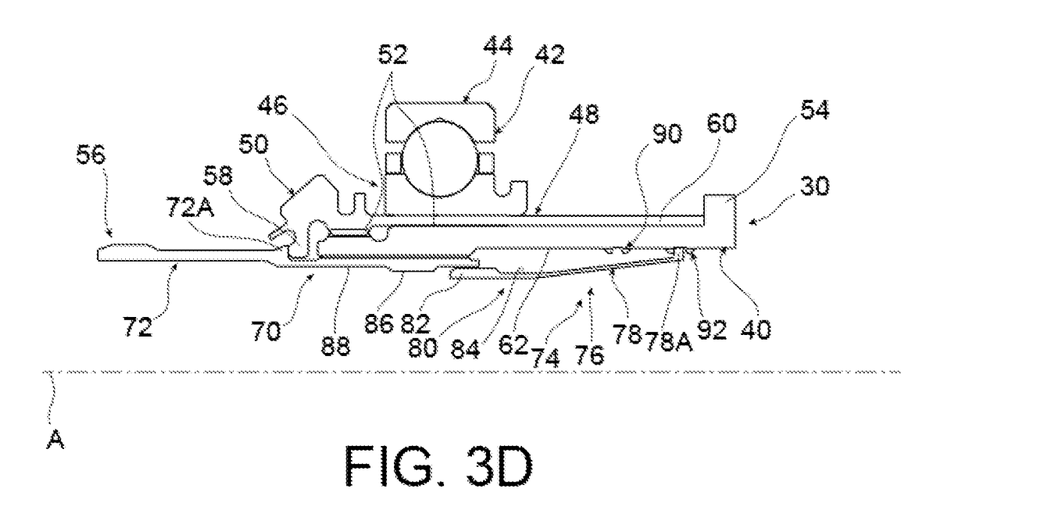

In a fourth step, corresponding to the transition between the state represented in FIG. 3C towards the state represented in FIG. 3D, the nut 56 is screwed onto the shaft tip 40 up to the position represented in FIG. 3D for which the downstream end 72A of the upstream section 72 bears axially downstream against the upstream end portion 58 of the bevel gear 50.

During this fourth step, the blocking member 74 is in a position downstream of the nut 56 which is such that its upstream section 80 is always located downstream of the nut 56 in order not to interfere with screwing of the nut 56.

Figure 3E:
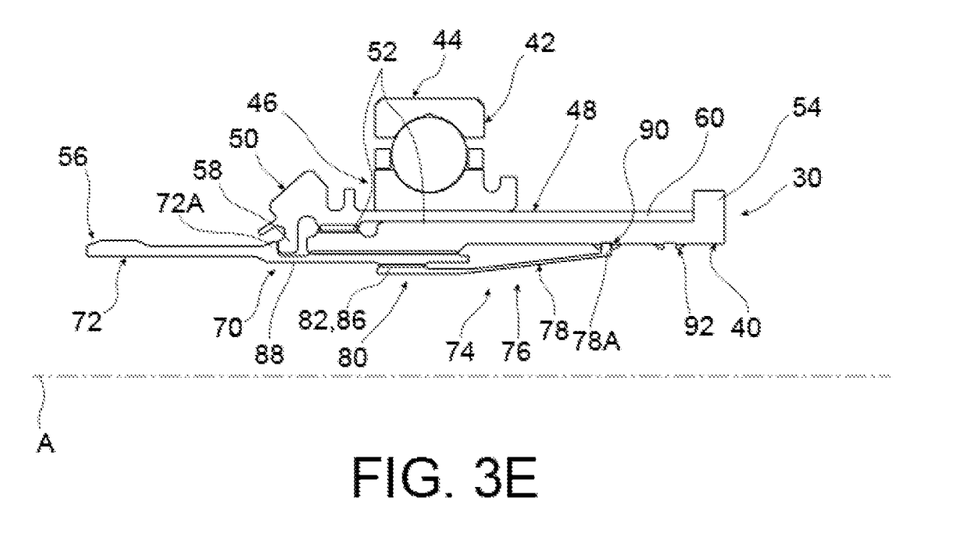

In a fifth step, corresponding to the transition between the state represented in FIG. 3D towards the state represented in FIG. 3E, the blocking member 74 is moved axially upstream up to its position of blocking the nut 56.

For this purpose, firstly, the legs 78 are elastically deformed to clear their free downstream ends 78A off the main axis A of the second annular groove 92 by reducing the overall diameter of the blocking member 74.

Afterwards, the blocking member 74 is moved axially upstream until coming into contact with the nut and it is then screwed onto the nut 56 by cooperation of their respective threads.

Screwing of the blocking member 74 onto the nut is performed until the blocking member 74 reaches the first axial position represented in FIG. 3E.

In this axial position, the free downstream ends 78A of the legs 78 are located axially at the level of the first annular groove 90.

The legs 78 are then deployed radially outwards by elastic return and their free downstream ends 78A are inserted into the first annular groove 90.

Upon completion of this step, as shown in FIG. 3E, the blocking member 74 cooperates simultaneously with the nut and with the shaft tip 40, thereby blocking any unscrewing of the nut 56 off the shaft tip 40.

Dismounting the major module including the high-pressure shaft is performed according to the sequence of the following steps:
removal of the blocking member 74;
blocking of the rotation and translation of the nut 56 by a specific tooling;
rotation of the high-pressure shaft to unscrew the latter and thus obtain an axial movement of the major module downstream.

As said before, the axial length of the complementary threads of the nut 56 and of the shaft tip 40 is determined so as to allow disengaging the interference fit between the cylindrical sleeve 48 of the bevel gear 50 and the shaft tip 40.

Thus, there is no additional step of axially moving the high-pressure shaft by a cylinder.

What is claimed is:

1. A sub-assembly of a turbomachine including a shaft of the turbomachine, the shaft defining a main axis, a bearing for guiding an axial end of said shaft, the sub-assembly including an axisymmetric sleeve mounted axially between the end of the shaft and an inner ring of the guide bearing, a nut which is linked to the end of the shaft at a first thread by screwing and which axially tightens the axisymmetric sleeve against a shoulder of the end of the shaft and a member for blocking the nut in rotation relative to the end of the shaft,
wherein the member for blocking the nut includes a first section carrying a plurality of flexible legs where one end of each leg cooperates with an annular wall radially internal to the end of the shaft and includes a second section which cooperates with the nut, and
wherein the second section of the blocking member is linked to the nut at a second thread by screwing and the characteristics of the second thread between the blocking member and the nut are different from the characteristics of the first thread between the nut and the end of the shaft.

2. The sub-assembly according to claim 1, wherein the direction of the second thread between the blocking member and the nut is opposite to the direction of the first thread between the nut and the end of the shaft.

3. The sub-assembly according to claim 1, wherein the radially internal annular wall features a thread and the nut includes a radially outer annular wall which features the first thread and the nut includes a radially outer annular wall which features a thread cooperating with the thread of the end of the shaft.

4. The sub-assembly according to claim 1, wherein the nut includes a radially inner annular wall which features the second thread and the blocking member includes a radially outer annular wall which features an outer thread cooperating with the inner thread of the nut.

5. The sub-assembly according to claim 1, wherein the radially inner annular wall of the end of the shaft includes at least one annular groove which receives said end of each leg of the blocking member.

6. The sub-assembly according to claim 5, wherein the radially inner annular wall of the end of the shaft includes a first annular groove which receives said end of each leg of the blocking member when the blocking member is screwed into the nut and a second annular groove which is offset with respect to the first annular groove, which receives said end of each leg of the blocking member at least during a phase of mounting or dismounting the nut on the end of the shaft.

7. The sub-assembly according to claim 1, wherein the nut includes a downstream section which cooperates with the end of the shaft and with the blocking member by screwing and which is disposed concentrically with and within the end of the shaft, and the nut includes an upstream section which protrudes axially upstream with respect to the end of the shaft and which bears axially downstream against the axisymmetric sleeve.

8. A method for mounting a sub-assembly according to claim 1, which includes:
a step of deforming the flexible legs using a tool intended to cooperate with the blocking member of the sub-assembly, wherein the tool is capable of imparting a radial deformation of the flexible legs in the direction of the main axis, in order to enable the rotation of the nut relative to the end of the shaft in a first direction, and of holding the flexible legs in the deformed configuration;
a step of inserting the blocking member into the end of the shaft in a predefined provisional axial position;
a step of removing the tool to enable an elastic return of the legs in the radially deployed configuration;
a step of placing the nut on the end of the shaft by screwing the nut onto the end of the shaft;
a step consisting consecutively of in elastically deforming the flexible legs by the tool, moving the blocking member axially upstream up to a blocking position of the nut and removing the tool to enable an elastic return of the legs.

9. A method for dismounting a sub-assembly according to claim 1, which includes:
- a step of deforming the flexible legs using a tool intended to cooperate with the blocking member of the sub-assembly, wherein the tool is capable of imparting a radial deformation of the flexible legs in the direction of the main axis, in order to enable the rotation of the nut relative to the end of the shaft in a first direction, and of holding these in the deformed configuration;
- a step of blocking the rotation and the translation of the nut by a specific tooling;
- a step of rotating the end of the shaft relative to the nut to unscrew the end of the shaft off the nut and thus obtaining an axial movement downstream of the end of the shaft relative to the nut and relative to the guide bearing.

* * * * *